United States Patent
Hashimoto

(10) Patent No.: US 9,534,094 B2
(45) Date of Patent: Jan. 3, 2017

(54) METHOD FOR PRODUCING (METH)ACRYLIC-MODIFIED POLYBUTADIENE

(71) Applicant: NIPPON SODA CO., LTD., Tokyo (JP)

(72) Inventor: Hiroki Hashimoto, Toride (JP)

(73) Assignee: NIPPON SODA CO., LTD., Tokyo (JP)

( * ) Notice: Subject to any disclaimer, the term of this patent is extended or adjusted under 35 U.S.C. 154(b) by 0 days.

(21) Appl. No.: 14/432,911

(22) PCT Filed: Nov. 6, 2013

(86) PCT No.: PCT/JP2013/006549
§ 371 (c)(1),
(2) Date: Apr. 1, 2015

(87) PCT Pub. No.: WO2014/076909
PCT Pub. Date: May 22, 2014

(65) Prior Publication Data
US 2015/0252150 A1   Sep. 10, 2015

(30) Foreign Application Priority Data

Nov. 13, 2012   (JP) ................. 2012-249329

(51) Int. Cl.
| | | |
|---|---|---|
| C08J 3/24 | (2006.01) | |
| C08C 19/28 | (2006.01) | |
| C08F 8/14 | (2006.01) | |
| C08F 18/14 | (2006.01) | |
| C08C 19/38 | (2006.01) | |
| B01J 31/22 | (2006.01) | |

(52) U.S. Cl.
CPC ............. C08J 3/24 (2013.01); B01J 31/223 (2013.01); C08C 19/38 (2013.01); C08F 18/14 (2013.01); *B01J 2231/49* (2013.01); *B01J 2531/31* (2013.01); *C08J 2347/00* (2013.01)

(58) Field of Classification Search
CPC ........................................................ C08F 8/14
USPC ......................................................... 525/257
See application file for complete search history.

(56) References Cited

U.S. PATENT DOCUMENTS

| | | | | |
|---|---|---|---|---|
| 4,692,351 A | * | 9/1987 | Maeda | ................ H05K 3/1241 118/410 |
| 5,032,179 A | * | 7/1991 | Fallstrom | ........... C09D 191/005 106/253 |
| 2005/0054798 A1 | | 3/2005 | Klang et al. | |
| 2007/0149757 A1 | * | 6/2007 | Nakajima | .............. C08G 63/82 528/274 |

FOREIGN PATENT DOCUMENTS

| | | | | |
|---|---|---|---|---|
| JP | S55-38809 A | | 3/1980 | |
| JP | 2006-045284 A | * | 2/2006 | ................ C08F 8/14 |
| JP | 2007-505184 A | | 3/2007 | |
| JP | 2007-211240 A | | 8/2007 | |
| JP | 2008-208155 A | | 9/2008 | |
| JP | 2011-116965 A | | 6/2011 | |
| JP | 2011-162776 A | | 8/2011 | |
| JP | 2011-195823 A | | 10/2011 | |
| WO | 2005/023887 A1 | | 3/2005 | |

OTHER PUBLICATIONS

Machine translated English language equivalent of JP 2006-045284 (Feb. 2006, 11 pages).*
Dec. 3, 2013 International Search Report issued in International Application No. PCT/JP2013/006549.

* cited by examiner

*Primary Examiner* — Brieann R Fink
(74) *Attorney, Agent, or Firm* — Oliff PLC

(57) ABSTRACT

An object of the present invention is to provide a method for producing (meth)acrylic-modified polybutadiene free from coloration and white turbidity without using a tin compound. The method for producing (meth)acrylic-modified polybutadiene of the present invention comprises reacting polybutadiene having a hydroxyl group at a terminal and a (meth)acrylic ester in the presence of an organoaluminum compound. As the organoaluminum compound, for example, a compound represented by formula (I) (wherein each of $R_1$, $R_2$, $R_3$, and $R_4$ independently represents a linear or branched C1 to C30 alkyl group) is preferred.

(I)

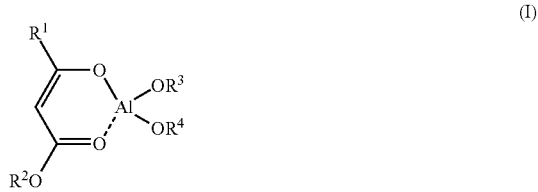

4 Claims, No Drawings

METHOD FOR PRODUCING (METH)ACRYLIC-MODIFIED POLYBUTADIENE

TECHNICAL FIELD

The present invention relates to a method for producing acrylic-modified polybutadiene. More specifically, the present invention relates to a method for producing (meth)acrylic-modified polybutadiene free from coloration and white turbidity without using a tin compound.

The present application claims priority to Japanese Patent Application No. 2012-249329 filed on Nov. 13, 2012, and the content thereof is incorporated herein.

BACKGROUND ART

Polybutadiene can be cured by heat, an ultraviolet ray, an electronic beam, or the like. Cured products of polybutadiene are resin materials excellent in water resistance, moisture resistance, chemical resistance, electric characteristics (high insulation resistance, a low dielectric constant, and an arc resisting property), and transparency and showing physical properties having high tenacity. Further, modified polybutadiene heightened in a curing property by heat, an ultraviolet ray, or an electronic beam by introducing a polymerizable functional group such as an acryloyl group or a methacryloyl group into the polybutadiene terminal is proposed (Patent Documents 1 and 2).

In Patent Document 1, terminal (meth)acrylic-modified polybutadiene is produced by the reaction of 1,2-polybutadienediol and a (meth)acrylic ester in the presence of an acid catalyst such as p-toluenesulfonic acid.

In Patent Document 2, (meth)acrylic-modified polybutadiene is produced by the reaction of hydroxyl group-containing polybutadiene and (meth)acrylic ester in the presence of a tetraalkoxytitanium catalyst, a dialkyltin dicarboxylate catalyst, or a dialkyltin oxide catalyst.

PRIOR ART DOCUMENTS

Patent Documents

Patent Document 1: Japanese Patent Application Publication No. 55-38809
Patent Document 2: Japanese Patent Application Publication No. 2007-211240

SUMMARY OF THE INVENTION

Object to be Solved by the Invention

The producing method described in Patent Document 1 has been accompanied by a problem such that acidic materials, for example, p-toluenesulfonic acid, remain in the objective product. Colorless and transparent (meth)acrylic-modified polybutadiene can be obtained by using dialkyltin dicarboxylate catalysts or dialkyltin oxide catalysts described in Patent Document 2. However, in recent years, the regulation of the use of organotin compounds has been strengthened. In the production of (meth)acrylic-modified polybutadiene, development of a producing method not using an organotin compound has also been desired. Transparent (meth)acrylic-modified polybutadiene can be obtained by using tetraalkoxytitanium catalysts described in Patent Document 2, but there remains a problem such that the (meth)acrylic-modified polybutadiene yellows.

Means to Solve the Object

As a result of earnest examination, the present inventors have found a method for producing colorless and transparent terminal (meth)acrylic-modified polybutadiene by using an organoaluminum compound as a catalyst for forming an ester bond without using an organotin compound, thus the present invention has been accomplished.

That is, the present invention are:
(1) A method for producing (meth)acrylic-modified polybutadiene comprising reacting polybutadiene having a hydroxyl group at a terminal and a (meth)acrylic ester in the presence of an organoaluminum compound.
(2) The method for producing (meth)acrylic-modified polybutadiene according to (1), wherein the organoaluminum compound is alkoxyaluminum.
(3) The method for producing (meth)acrylic-modified polybutadiene according to (2), wherein the alkoxyaluminum is a compound represented by formula (I):

(wherein each of $R^1$, $R^2$, $R^3$, and $R^4$ independently represents a linear or branched C1 to C30 alkyl group).
(4) The method for producing (meth)acrylic-modified polybutadiene according to (1), wherein the (meth)acrylic ester is a compound represented by formula (II):

(wherein $R^5$ represents a hydrogen atom or a methyl group, and $R^6$ represents a linear or branched C1 to C6 alkyl group).
(5) The method for producing (meth)acrylic-modified polybutadiene according to any one of (1) to (4), wherein the polybutadiene having a hydroxyl group at a terminal is partially or wholly hydrogenated.
(6) The method for producing (meth)acrylic-modified polybutadiene according to any one of (1) to (5), wherein the polybutadiene having a hydroxyl group at a terminal has a hydroxyl group at both terminals.

Effect of the Invention

According to the producing method of the present invention, (meth)acrylic-modified polybutadiene free from coloration and white turbidity can be produced without using an organotin compound.

MODE OF CARRYING OUT THE INVENTION ((Meth)acrylic-modified Polybutadiene)

The (meth)acrylic-modified polybutadiene of the present invention is not especially limited so long as it has a (meth)acryloyl group bonding to at least one terminal of the polybutadiene chain via an ester bond. Further, the polybutadiene chain of the (meth)acrylic-modified polybutadiene of the present invention may be partially or wholly hydrogenated. In the present invention, (meth)acryl denotes acryl and methacryl.

The (meth)acrylic-modified polybutadiene of the present invention can be represented by the following formula (III).

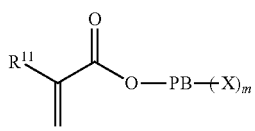
(III)

In formula (III), $R^{11}$ represents a hydrogen atom or a methyl group; PB represents a polymeric chain obtainable by polymerization of butadiene or a polymeric chain obtainable by hydrogenation of the aforementioned polymeric chain; and X represents an OH group or formula (IV).

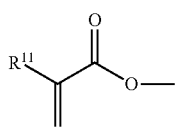
(IV)

In the above formula, m represents 0 or 1.

The polymeric chain obtainable by polymerization of butadiene or the polymeric chain obtainable by hydrogenation of the aforementioned polymeric chain, represented by PB in formula (III), has a repeating unit by a 1,4-bond represented by the following formula (V):

(V)

(wherein the double line part consisting of a solid line and a dotted line represents a single bond or a double bond. The wavy line represents either a cis form or a trans form in the case of a double bond)
and a repeating unit by a 1,4-bond represented by the following formula (VI)

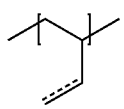
(VI)

(wherein the double line part consisting of a solid line and a dotted line represents a single bond or a double bond) as a backbone.

In the case where the double line part consisting of a solid line and a dotted line represents a double bond, the polybutadiene denotes polybutadiene not hydrogenated yet, and in the case where the double line part represents a single bond, the polybutadiene denotes hydrogenated polybutadiene. In the case of hydrogenated polybutadiene, it is not necessary that 100% of vinyl groups are hydrogenated, and the residual rate of vinyl groups is not especially limited.

When the repeating unit by a 1,4-bond represented by formula (V) has a double bond, a trans form, a cis form, or a mixture of them can exist.

The proportions of the repeating unit by a 1,4-bond represented by formula (V) and the repeating unit by a 1,2-bond represented by formula (VI) are from 0 mol % to 100 mol %, respectively. That is, in the present invention, the polymeric chain represented by PB may be a polymer having a 1,4-bond or a 1,2-bond alone, or may be a polymer having a 1,4-bond and a 1,2-bond in combination.

The number average molecular weight of the terminal acrylic-modified polybutadiene or the terminal acrylic-modified hydrogenated polybutadiene of the present invention is from 500 to 10,000 determined by means of the GPC (gel permeation chromatography) method in terms of polystyrene.

(Producing Method)

The (meth)acrylic-modified polybutadiene of the present invention can be produced by the reaction of polybutadiene having a hydroxyl group at a terminal and a (meth)acrylic ester in the presence of an organoaluminum compound.

The polybutadiene having a hydroxyl group at a terminal is not especially limited so long as it has at least one hydroxyl group bonding to the terminal portion of the polybutadiene chain. As such polybutadiene, polybutadiene having a hydroxyl group bonding to both terminal portions of the polybutadiene chain is preferred. The structure of the portion of bonding a polybutadiene chain and a hydroxyl group is not especially limited.

The polybutadiene having a hydroxyl group at a terminal of the present invention can be represented, for example, by the following formula (VII):

(VII)

(wherein PB is the same as the above, and n represents 1 or 2).

As the polybutadiene having a hydroxyl group at a terminal, commercially available products can be used. Examples thereof include NISSO-PB (registered trademark)-G-1000 (manufactured by Nippon Soda Co., Ltd.), NISSO-PB (registered trademark)-G-2000 (manufactured by Nippon Soda Co., Ltd.), NISSO-PB (registered trademark)-G-3000 (manufactured by Nippon Soda Co., Ltd.), NISSO-PB (registered trademark)-GI-1000 (manufactured by Nippon Soda Co., Ltd.), NISSO-PB (registered trademark)-GI-2000 (manufactured by Nippon Soda Co., Ltd.), NISSO-PB (registered trademark)-GI-3000 (manufactured by Nippon Soda Co., Ltd.), and Poly bd R45HT (manufactured by Idemitsu Kosan Co., Ltd.). These products can be used singly or in combinations of two or more.

The (meth)acrylic ester denotes a methacrylic alkyl ester or an acrylic alkyl ester. Examples of the (meth)acrylic ester in the present invention include a compound represented by the following formula (II):

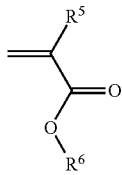
(II)

(wherein $R^5$ represents a hydrogen atom or a methyl group, and $R^6$ represents a linear or branched C1 to C6 alkyl group).

Examples of "linear or branched C1 to C6 alkyl groups" include a methyl group, an ethyl group, a n-propyl group, an isopropyl group, a n-butyl group, a sec-butyl group, a t-butyl group, a n-pentyl group, an isopentyl group, a neopentyl group, a t-pentyl group, a 1-methylpentyl group, a 2-methylpentyl group, a n-hexyl group, and an isohexyl group. Of these groups, C1 to C3 alkyl groups are preferred, and a methyl group and an ethyl group are more preferred.

Specific examples of the compound represented by formula (II) include methyl methacrylate, ethyl methacrylate, methyl acrylate, and ethyl acrylate.

The amount of the above (meth)acrylic esters used is not especially limited, but is preferably from 1 to 500 times the mol of a hydroxyl group of the polybutadiene having a hydroxyl group at a terminal, and more preferably from 1 to 20 times the mol.

The organoaluminum compound is a compound in which an organic group is bonded to the aluminum atom. The group to bond to the aluminum atom is not especially limited so long as it does not have adverse influence on the reaction. A preferred organoaluminum compound in the present invention is aluminum alkoxide, which is, for example, a compound represented by formula (I):

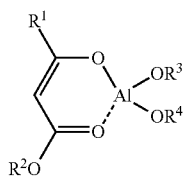
(I)

(wherein each of $R^1$, $R^2$, $R^3$, and $R^4$ independently represents a linear or branched C1 to C30 alkyl group).

Examples of "linear or branched C1 to C30 alkyl groups" include a methyl group, an ethyl group, a n-propyl group, an isopropyl group, a n-butyl group, a sec-butyl group, a t-butyl group, a n-pentyl group, an isopentyl group, a neopentyl group, a t-pentyl group, a 1-methylpentyl group, a 2-methylpentyl group, a n-hexyl group, an isohexyl group, a n-heptyl group, a 6,6-dimethylheptyl group, a 1,1-dimethylheptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group.

Specific examples of the organoaluminum compounds represented by formula (I) include compounds shown below.

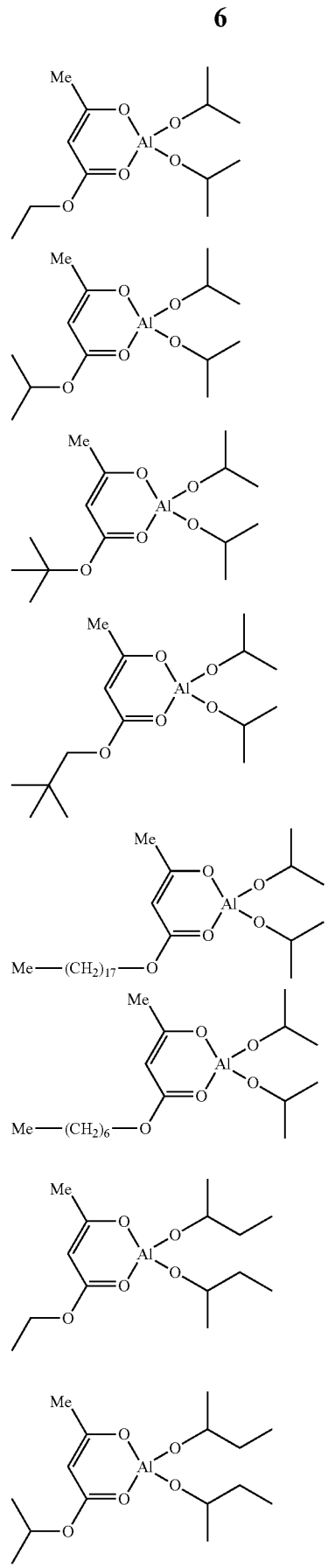

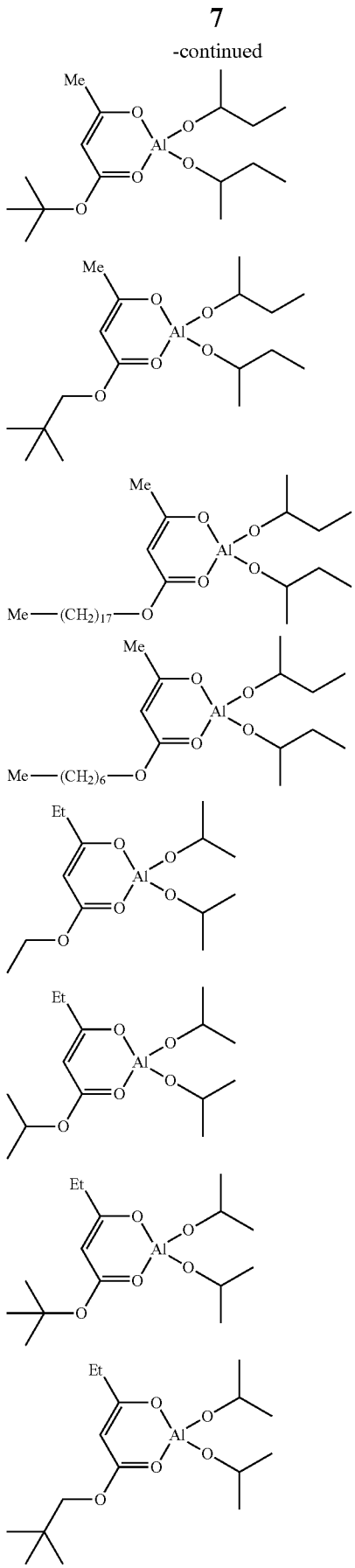

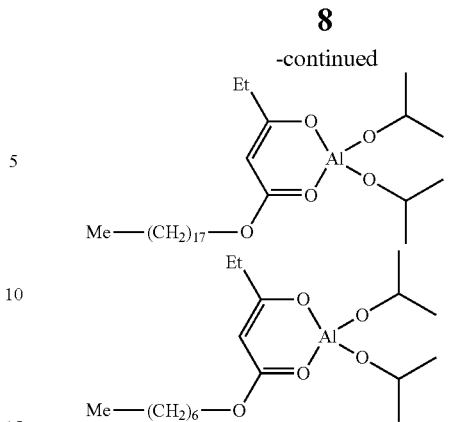

The amount of the above organoaluminum compounds used is from 0.001 parts by weight to 50 parts by weight, and preferably from 0.1 parts by weight to 10 parts by weight based on 100 parts by weight of the polybutadiene having a hydroxyl group at a terminal.

Transesterification of the polybutadiene having a hydroxyl group and (meth)acrylic ester may be carried out in the absence of a solvent, or may be carried out in a solvent.

When the reaction is carried out in a solvent, the solvent to be used is not especially limited so long as it is inert to the transesterification.

Examples of the solvents to be used include aromatic hydrocarbon solvents, e.g., benzene, toluene, xylene, chlorobenzene, and dichlorobenzene; alicyclic hydrocarbon solvents, e.g., cyclohexane and cycloheptane; aliphatic hydrocarbon solvents, e.g., hexane and heptane; ether series solvents, e.g., diethyl ether, diisopropyl ether, dioxane, tetrahydrofuran, and 1,2-dimethoxyethane; nitrile solvents, e.g., acetonitrile and benzonitrile; amide solvents, e.g., N,N-dimethylformamide, N,N-dimethylacetamide, and hexamethylphosphoroamide; ester solvents, e.g., ethyl acetate, isopropyl acetate, and n-butyl acetate; glycol ether ester solvents, e.g., ethyl cellosolve acetate, methyl cellosolve acetate, propylene glycol monomethyl ether acetate (PGMEA), and propylene glycol monoethyl ether acetate; and sulfur-containing solvents, e.g., dimethyl sulfoxide and sulfolane.

The reaction temperature is preferably from 0° C. to 200° C. and more preferably in the range from room temperature to 170° C. The reaction is generally completed in several minutes to several hours.

A stabilizer may be added in the above transesterification. By the addition of a stabilizer, a side reaction can be restrained all the more. Examples of the stabilizers include a phenolic stabilizer, a phosphorus stabilizer, and a sulfur stabilizer.

Examples of the phenolic stabilizers include 2,6-di-t-butyl-p-cresol (BHT), hydroquinone (HQ), methoquinone (MQ), and 4-t-butylcatechol (TBC). Examples of the phosphorus stabilizers include trinonylphenylphosphite (TNP) and phosphorous ester. Examples of the sulfur stabilizers include 2-methyl-4,6-bis-octylthiomethyl-phenol, dilauryl-3,3'-thiodipropionate (TPL), and 4,4'-thiobis(3-methyl-6-t-butylphenol).

The amount of the stabilizer added is from 0.01 parts by weight to 10 parts by weight, and more preferably from 0.05 parts by weight to 2 parts by weight based on 100 parts by weight of the (meth)acrylic ester.

EXAMPLES

In the next place, the present invention will be described in further detail with reference to Examples, but the present invention is not limited to the following Examples. Incidentally, chromaticity of the (meth)acrylic-modified polybutadiene was evaluated by visual observation of the appearance, Gardner indication by the measurement with a Gardner colorimeter, or APHA indication by means of hue standard. With the increase in numerical values, yellowish brown deepens both in Gardner chromaticity and APHA chromaticity, and Gardner chromaticity 1 almost corresponds to APHA chromaticity 250.

(Production of Acrylic-modified Polybutadiene)

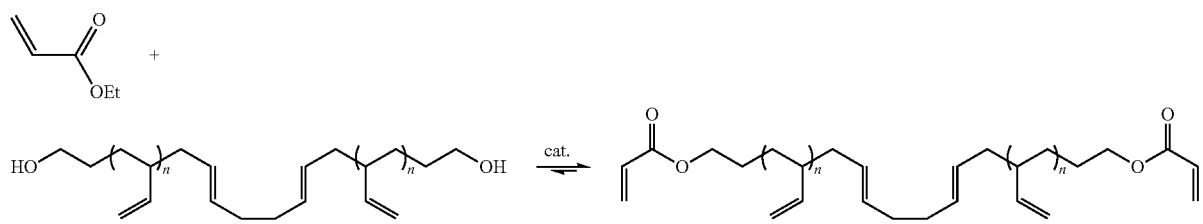

Example 1

Into a separable flask having a capacity of 500 mL were put 300.0 g of NISSO-PB (registered trademark)-G-3000 (manufactured by Nippon Soda Co., Ltd.), 79.21 g of ethyl acrylate, 0.78 g of dibutylhydroxytoluene (BHT), and 6.86 g of aluminum chelate M (manufactured by Kawaken Fine Chemical Co., Ltd.; alkyl acetoacetate aluminum diisopropylate), and they were then stirred at 115° C. to 120° C. for 5 hours. The reaction solution was concentrated under reduced pressure to obtain polybutadiene which was acrylic-modified at the terminal portion. The transesterification rate of the obtained terminal acrylic-modified polybutadiene was 97%. The appearance of the obtained acrylic-modified polybutadiene was free from turbidity and transparent. APHA chromaticity was 30.

Incidentally, the "transesterification rate" means a rate of acrylation of terminal hydroxyl groups of NISSO-PB (registered trademark)-G-3000. The transesterification rate can be calculated from the NMR integration values of the hydroxyl group and the methylene hydrogen adjacent to the acryl group.

Example 2

Terminal acrylic-modified polybutadiene was obtained in the same manner as in Example 1 except for changing the amount of aluminum chelate M added to 3.42 g, and BHT to 0.78 g of HP-400 (manufactured by Kawaguchi Chemical Industry Co., Ltd.; 2-methyl-4,6-bis-octylthiomethyl-phenol). The transesterification rate of the obtained terminal acrylic-modified polybutadiene was 85%. The appearance of the obtained acrylic-modified polybutadiene was free from turbidity and transparent. APHA chromaticity was 30, and Gardner chromaticity was <1.

Example 3

Terminal acrylic-modified polybutadiene was obtained in the same manner as in Example 2 except for changing the amount of aluminum chelate M added to 5.14 g. The transesterification rate of the obtained terminal acrylic-modified polybutadiene was 96%. The appearance of the obtained acrylic-modified polybutadiene was free from turbidity and transparent. APHA chromaticity was 40, and Gardner chromaticity was <1.

Example 4

Terminal acrylic-modified polybutadiene was obtained in the same manner as in Example 2 except for changing aluminum chelate M to 2.82 g of ALCH (manufactured by Kawaken Fine Chemical Co., Ltd.; ethyl acetoacetate aluminum diisopropylate). The transesterification rate of the obtained terminal acrylic-modified polybutadiene was 97%. The appearance of the obtained acrylic-modified polybutadiene was free from turbidity and transparent. APHA chromaticity was 30, and Gardner chromaticity was <1.

Example 5

Terminal acrylic-modified polybutadiene was obtained in the same manner as in Example 2 except for changing aluminum chelate M to 1.72 g of ALCH (manufactured by Kawaken Fine Chemical Co., Ltd.; ethyl acetoacetate aluminum diisopropylate). The transesterification rate of the obtained terminal acrylic-modified polybutadiene was 94%. The appearance of the obtained acrylic-modified polybutadiene was free from turbidity and transparent. APHA chromaticity was 20, and Gardner chromaticity was <1.

(Production of Methacrylic-modified Polybutadiene)

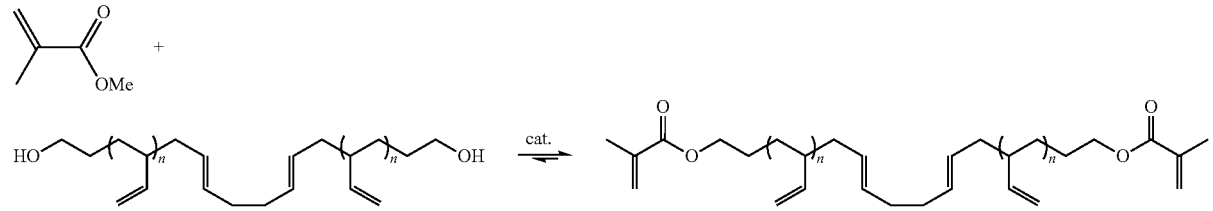

Example 6

Into a separable flask having a capacity of 500 mL were put and mixed 300 g of NISSO-PB (registered trademark)-G-3000 (manufactured by Nippon Soda Co., Ltd.), 79.24 g of methyl methacrylate, 0.79 g of HP-400 (manufactured by Kawaguchi Chemical Industry Co., Ltd.; 2-methyl-4,6-bis-octylthiomethyl-phenol), and 2.75 g of ALCH (manufactured by Kawaken Fine Chemical Co., Ltd.; ethyl acetoacetate aluminum diisopropylate), and they were then stirred at 115° C. to 120° C. for 5 hours. The reaction solution was concentrated under reduced pressure to obtain hydrogenated polybutadiene which was methacrylic-modified at the terminal portion. The transesterification rate of the obtained terminal methacrylic-modified hydrogenated polybutadiene was 97%. The appearance of the obtained methacrylic-modified polybutadiene was free from turbidity and transparent. APHA chromaticity was 30, and Gardner chromaticity was <1.

Comparative Example 1

Into a separable flask having a capacity of 500 mL were put and mixed 300 g of NISSO-PB (registered trademark)-G-3000 (manufactured by Nippon Soda Co., Ltd.), 79.26 g of methyl methacrylate, 0.79 g of HP-400 (manufactured by Kawaguchi Chemical Industry Co., Ltd.), and 1.72 g of B-1 (manufactured by Nippon Soda Co., Ltd.; B-1: tetra-n-butoxytitanium), and they were then stirred at 115° C. to 120° C. for 5 hours. The reaction solution was concentrated under reduced pressure to obtain hydrogenated polybutadiene which was methacrylic-modified at the terminal portion. The transesterification rate of the obtained terminal methacrylic-modified hydrogenated polybutadiene was 98%. The appearance of the obtained methacrylic-modified polybutadiene was dark yellow and transparent. APHA chromaticity was >100, and Gardner chromaticity was 4.

Comparative Example 2

Into a separable flask having a capacity of 500 mL were put and mixed 300 g of NISSO-PB (registered trademark)-G-3000 (manufactured by Nippon Soda Co., Ltd.), 79.26 g of methyl methacrylate, 0.80 g of HP-400 (manufactured by Kawaguchi Chemical Industry Co., Ltd.), and 1.71 g of T-60 (manufactured by Nippon Soda Co., Ltd.; T-60: propanedioxytitanium bis(ethyl acetoacetate)), and they were then stirred at 115° C. to 120° C. for 5 hours. The reaction solution was concentrated under reduced pressure to obtain hydrogenated polybutadiene which was methacrylic-modified at the terminal portion. The transesterification rate of the obtained terminal methacrylic-modified hydrogenated polybutadiene was 93%. The appearance of the obtained methacrylic-modified polybutadiene was dark yellow and transparent. APHA chromaticity was >100, and Gardner chromaticity was 4.

Comparative Example 3

Into a separable flask having a capacity of 500 mL were put and mixed 300 g of NISSO-PB (registered trademark)-G-3000 (manufactured by Nippon Soda Co., Ltd.), 79.26 g of methyl methacrylate, 0.15 g of dibutylhydroxytoluene (BHT), and 1.71 g of TBP (manufactured by Nippon Soda Co., Ltd.; titanium n-butylphosphate), and they were then stirred at 115° C. to 120° C. for 5 hours. However, transesterification did not progress.

The invention claimed is:

1. A method for producing (meth)acrylic-modified polybutadiene comprising reacting polybutadiene having a hydroxyl group at a terminal and a (meth)acrylic ester in the presence of a catalyst consisting of an organoaluminum compound represented by formula (I):

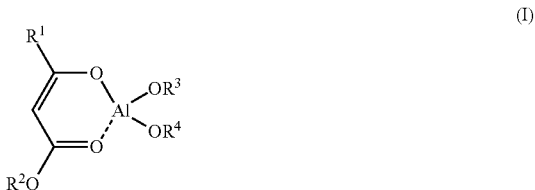

(wherein each of $R^1$, $R^2$, $R^3$, and $R^4$ independently represents a linear or branched C1 to C30 alkyl group).

2. The method for producing (meth)acrylic-modified polybutadiene according to claim 1, wherein the (meth)acrylic ester is a compound represented by formula (II):

(wherein $R^5$ represents a hydrogen atom or a methyl group, and $R^6$ represents a linear or branched C1 to C6 alkyl group).

3. The method for producing (meth)acrylic-modified polybutadiene according to claim 1, wherein the polybutadiene having a hydroxyl group at a terminal is partially or wholly hydrogenated.

4. The method for producing (meth)acrylic-modified polybutadiene according to claim 1, wherein the polybutadiene having a hydroxyl group at a terminal has a hydroxyl group at both terminals.

* * * * *